(12) United States Patent
Uemoto et al.

(10) Patent No.: US 10,929,207 B2
(45) Date of Patent: Feb. 23, 2021

(54) NOTIFICATION CONTROL DEVICE, NOTIFICATION CONTROL METHOD, AND STORAGE MEDIUM

(71) Applicant: JVCKENWOOD Corporation, Yokohama (JP)

(72) Inventors: Masashi Uemoto, Yokohama (JP); Toru Kaiwa, Yokohama (JP); Masaki Takei, Yokohama (JP); Aki Hamada, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 16/681,854

(22) Filed: Nov. 13, 2019

(65) Prior Publication Data

US 2020/0210251 A1 Jul. 2, 2020

(30) Foreign Application Priority Data

Dec. 28, 2018 (JP) .............................. JP2018-248425
Dec. 28, 2018 (JP) .............................. JP2018-248426

(51) Int. Cl.
*G06F 9/54* (2006.01)
*G06F 11/34* (2006.01)
*G06F 3/01* (2006.01)

(52) U.S. Cl.
CPC .............. *G06F 9/542* (2013.01); *G06F 3/011* (2013.01); *G06F 3/017* (2013.01); *G06F 11/3438* (2013.01)

(58) Field of Classification Search
CPC ........................................................ G06F 9/542
USPC .................................................... 719/318
See application file for complete search history.

(56) References Cited

U.S. PATENT DOCUMENTS

| 8,344,901 | B2* | 1/2013 | Tysowski | G08B 21/00 |
| | | | | 340/669 |
| 8,731,221 | B2* | 5/2014 | Ura | H04R 25/50 |
| | | | | 381/315 |
| 10,360,557 | B2* | 7/2019 | Locke | G06Q 20/4016 |
| 2019/0066630 | A1* | 2/2019 | Fukazawa | G02B 27/0172 |

FOREIGN PATENT DOCUMENTS

JP      2000-032167      1/2000

* cited by examiner

*Primary Examiner* — Andy Ho (74) *Attorney, Agent, or Firm* — Amin, Turocy & Watson, LLP (57) ABSTRACT

A notification control device includes a surrounding situation determination unit that determines a situation around a user, an impact detection unit that detects an impact on an electronic device possessed by the user, a drop determination unit that determines whether or not the impact occurs by drop of the electronic device, a notification method selection unit that selects a notification method in accordance with the situation around the user in a case where the impact occurs by the drop, and a notification control unit that controls a notification unit configured to notify the user of information such that the notification is performed by the notification method selected by the notification method selection unit.

10 Claims, 5 Drawing Sheets

| CURRENT POSITION | NOTIFICATION METHOD |
|---|---|
| HOME | FIRST NOTIFICATION METHOD |
| WORKPLACE | SECOND NOTIFICATION METHOD |
| TRAIN | THIRD NOTIFICATION METHOD |
| ⋮ | ⋮ |

NOTIFICATION CONTROL DEVICE, NOTIFICATION CONTROL METHOD, AND STORAGE MEDIUM

CROSS-REFERENCE TO RELATED APPLICATIONS

This application claims priority from Japanese Application No. 2018-248425, filed on Dec. 28, 2018 and Japanese Application No. 2018-248426, filed on Dec. 28, 2018, the contents of which are incorporated by reference herein in its entirety.

BACKGROUND

1. Technical Field

The present disclosure relates to a notification control device, a notification control method, and a storage medium.

2. Description of the Related Art

A technology of preventing loss by sounding an alarm when an electronic device such as a portable terminal device drops is known (for example, JP 2000-32167 A).

However, in the technology as disclosed in JP 2000-32167 A, there is a possibility that sounding an alarm is not the best notification method in an environment in which surrounding noise is loud, for example. Therefore, a notification method effective for preventing loss in a case where an electronic device drops is required.

SUMMARY

It is an object of the present disclosure to at least partially solve the problems in the conventional technology.

A notification control device according to the present disclosure includes a surrounding situation determination unit that determines a situation around a user, an impact detection unit that detects an impact on an electronic device possessed by the user, a drop determination unit that determines whether or not the impact occurs by drop of the electronic device, a notification method selection unit that selects a notification method in accordance with the situation around the user in a case where the impact occurs by the drop, and a notification control unit that controls a notification unit configured to notify the user of information such that the notification is performed by the notification method selected by the notification method selection unit.

A notification control method according to the present disclosure includes a surrounding situation determination step of determining a situation around a user, an impact detection step of detecting an impact on an electronic device possessed by the user, a drop determination step of determining whether or not the impact occurs by drop of the electronic device, a notification method selection step of selecting a notification method in accordance with the situation around the user in a case where the impact occurs by the drop, and a notification control step of controlling a notification unit configured to notify the user of information such that the notification is performed by the notification method selected in the notification method selection step.

A non-transitory computer-readable storage medium storing a program according to the present disclosure causes a computer to execute a surrounding situation determination step of determining a situation around a user, an impact detection step of detecting an impact on an electronic device possessed by the user, a drop determination step of determining whether or not the impact occurs by drop of the electronic device, a notification method selection step of selecting a notification method in accordance with the situation around the user in a case where the impact occurs by the drop, and a notification control step of controlling a notification unit configured to notify the user of information such that the notification is performed by the notification method selected in the notification method selection step.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

Hereinafter, embodiments according to the present disclosure will be described in detail with reference to the accompanying drawings. The present disclosure is not limited by the embodiments. In a case where a plurality of embodiments is provided, the present disclosure includes a configuration obtained by combining the embodiments.

First Embodiment

Figure 1:
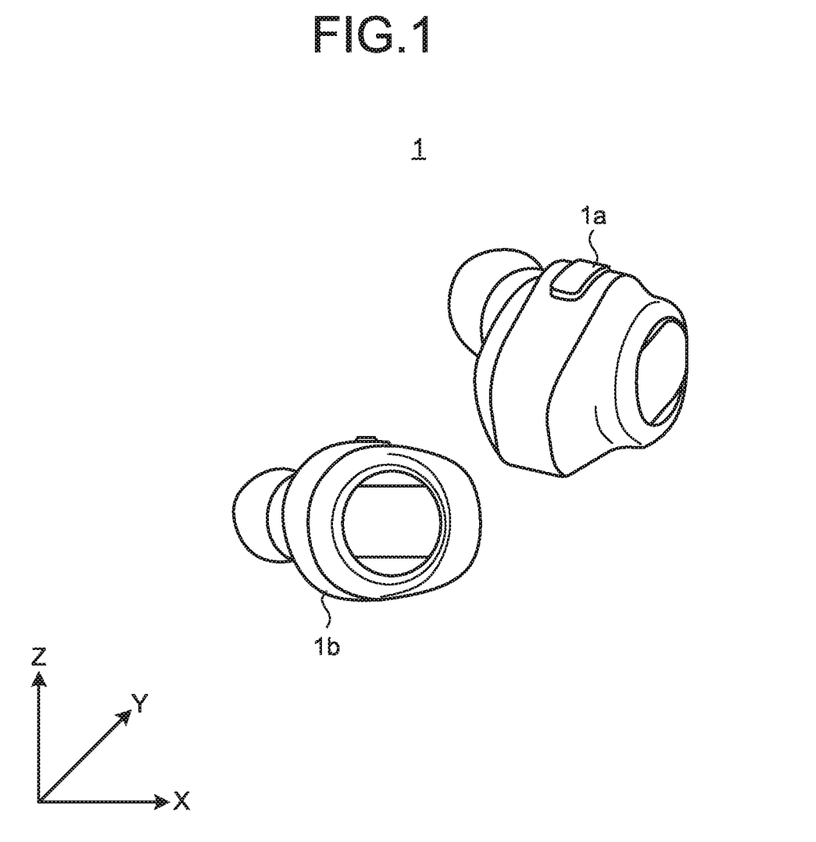
FIG. 1 is a schematic diagram illustrating an example of an electronic device to which a notification control device according to an embodiment is applied.

An example of an electronic device according to an embodiment of the present disclosure will be described with reference to FIG. 1. FIG. 1 is a diagram illustrating the example of the electronic device in the present disclosure.

As illustrated in FIG. 1, electronic devices 1 according to the embodiment are wireless headphones 1a and 1b, for example. Descriptions will be made below on the assumption that the electronic devices 1 according to the embodiment are the wireless headphones 1a and 1b. However, this is just an example and does not limit the present disclosure. In the embodiment of the present disclosure, the electronic device may be a compact electronic device which can be carried by a user.

Figure 2:
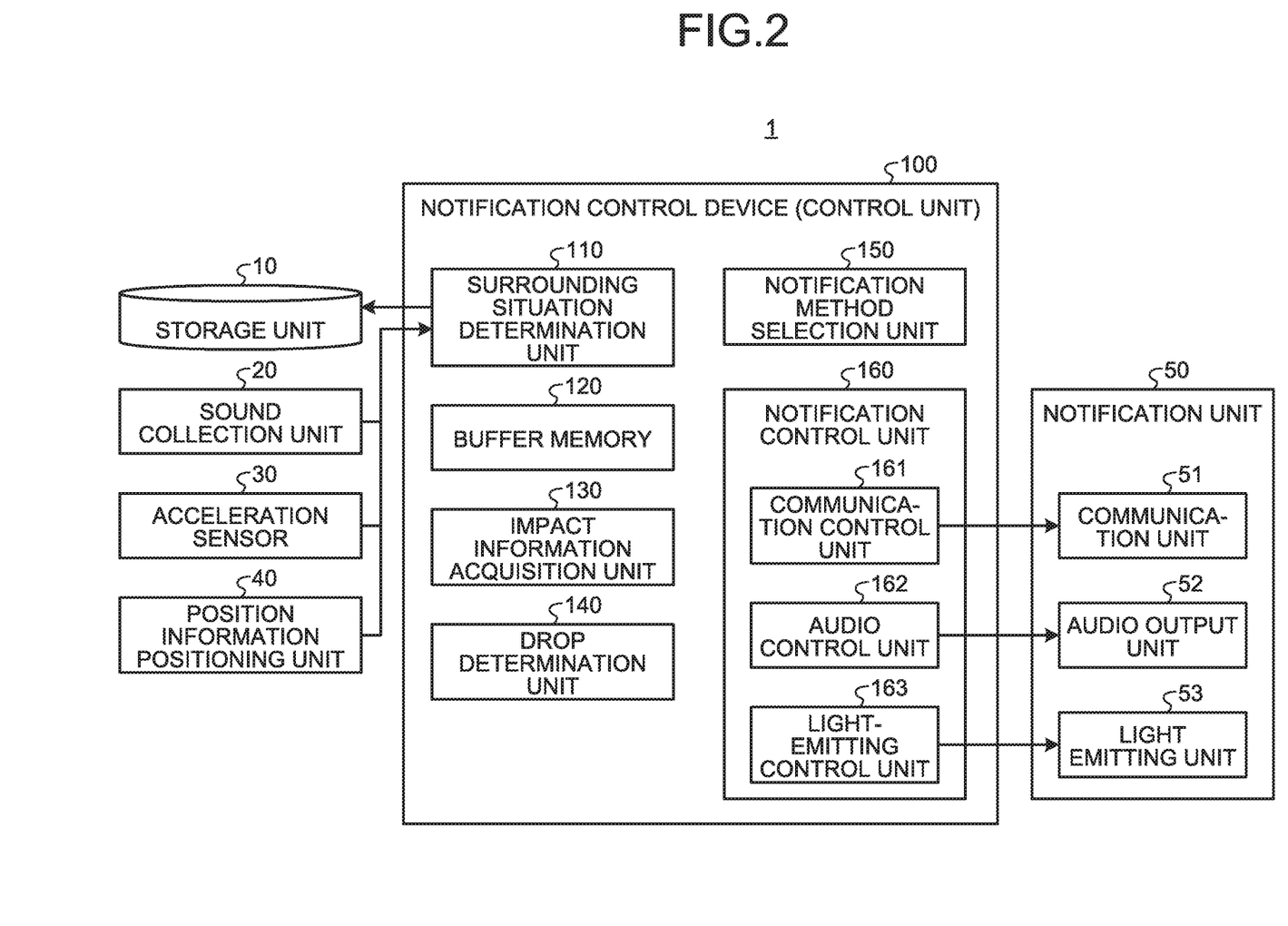
FIG. 2 is a block diagram illustrating an example of a configuration of the notification control device in the embodiment.

A configuration of the electronic device according to the embodiment will be described with reference to FIG. 2. FIG. 2 is a block diagram illustrating an example of the configuration of the electronic device.

As illustrated in FIG. 2, the electronic device 1 includes a storage unit 10, a sound collection unit 20, an acceleration sensor 30, a position information positioning unit 40, a notification unit 50, and a notification control device (control unit) 100.

The storage unit 10 stores, for example, a program for realizing the components of the notification control device 100. In this case, the notification control device 100 realizes functions of the components by developing and executing the program stored in the storage unit 10. The storage unit 10 can be realized, for example, by a semiconductor memory element such as a random access memory (RAM), a read only memory (ROM), and a flash memory, or a storage device such as a hard disk, a solid state drive, and an optical disk.

The sound collection unit 20 collects various sounds. For example, the sound collection unit 20 collects an environmental sound around the electronic device 1. The sound collection unit 20 can be realized, for example, by a normal microphone. The sound collection unit 20 outputs the collected environmental sound as audio information to a surrounding situation determination unit 110.

The acceleration sensor 30 detects an acceleration acting on the electronic device 1. For example, the acceleration sensor 30 detects accelerations in an X-axis direction, a Y-axis direction, and a Z-axis direction as illustrated in FIG. 1. The X-axis, the Y-axis, and the Z-axis are perpendicular to each other. The acceleration sensor 30 outputs the detected acceleration as acceleration information to the surrounding situation determination unit 110.

The position information positioning unit 40 acquires information regarding the current position of the electronic device 1. The position information positioning unit 40 can be realized, for example, by a global positioning system (GPS) receiving circuit or a GPS receiving antenna. In this case, the position information positioning unit 40 receives a GPS signal. The position information positioning unit 40 outputs, for example, information regarding the acquired current position of the electronic device 1 to the surrounding situation determination unit 110.

The notification unit 50 notifies a user of various kinds of information. For example, when the electronic device 1 has dropped, the notification unit 50 notifies the user that the electronic device 1 has dropped. For example, when the electronic device 1 has dropped, and thus is lost, the notification unit 50 notifies the user of a situation including an action of the user when the electronic device 1 has dropped. The notification unit 50 includes a communication unit 51, an audio output unit 52, and a light emitting unit 53, for example.

The communication unit 51 performs information communication with an external information communication device via a wired or wireless network (not illustrated). The communication unit 51 causes information communication to be performed between the notification control device 100 and a terminal device possessed by the user, for example, in accordance with control of a communication control unit 161. Here, examples of the terminal device can include a personal computer (PC), a smartphone, and a tablet terminal. However, the embodiment is not limited thereto.

The audio output unit 52 outputs various kinds of audio. The audio output unit 52 outputs audio for notifying the user of various kinds of information, for example, in accordance with control of an audio control unit 162. Specifically, for example, when the electronic device 1 has dropped, the audio output unit 52 outputs audio for notifying the user that the electronic device 1 has dropped. The audio output unit 52 can be realized, for example, by a normal speaker.

The light emitting unit 53 emits various kinds of light. The light emitting unit 53 emits light for notifying the user of various kinds of information, for example, in accordance with control of a light-emitting control unit 163. Specifically, for example, when the electronic device 1 has dropped, the light emitting unit 53 emits light for notifying the user that the electronic device 1 has dropped. The light emitting unit 53 can be realized, for example, by a light emitting diode (LED).

The notification control device 100 includes the surrounding situation determination unit 110, a buffer memory 120, an impact information acquisition unit 130, a drop determination unit 140, a notification method selection unit 150, and a notification control unit 160. The notification control device 100 realizes functions of the components by developing and executing the program stored in the storage unit 10. The notification control device 100 can be realized, for example, by an electronic circuit including a central processing unit (CPU).

The surrounding situation determination unit 110 acquires various kinds of information for determining a situation around the electronic device 1. For example, the surrounding situation determination unit 110 acquires audio information from the sound collection unit 20. For example, the surrounding situation determination unit 110 acquires acceleration information from the acceleration sensor 30. For example, the surrounding situation determination unit 110 acquires current position information from the position information positioning unit 40.

The surrounding situation determination unit 110 determines the situation around the electronic device 1 based on the acquired information. For example, the surrounding situation determination unit 110 determines the magnitude of surrounding noise based on the audio information.

For example, the surrounding situation determination unit 110 determines an action of the user based on the acceleration information. For example, the surrounding situation determination unit 110 determines a movement situation, for example, whether the user moves by walking, by running, by riding on a bicycle, or by riding in a train, or the user does not move, based on the acceleration information.

For example, the surrounding situation determination unit 110 determines the current position of the user based on the current position information. Specifically, the surrounding situation determination unit 110 determines, for example, whether the user is at home, at work, or in a public facility such as a station, based on the current position information.

For example, the surrounding situation determination unit 110 continuously determines the surrounding situation at a predetermined interval and stores a determination result in the storage unit 10. In a case where a new determination result is to be stored, the storage unit 10 may perform deletion or overwriting in order from the old determination result.

The buffer memory 120 temporarily stores various kinds of information. The buffer memory 120 temporarily stores the determination result obtained by the surrounding situation determination unit 110.

The impact information acquisition unit 130 acquires information regarding various impacts acting on the electronic device 1. For example, the impact information acquisition unit 130 acquires the acceleration information obtained by detection of the acceleration sensor 30, as the information regarding the impact acting on the electronic device 1. In this case, the impact information acquisition unit 130 may directly acquire the acceleration information from the acceleration sensor 30 or read the acceleration information stored in the storage unit 10.

The drop determination unit 140 determines whether or not the electronic device 1 has dropped. For example, the drop determination unit 140 determines the electronic device 1 has dropped, based on the acceleration information acquired by the impact information acquisition unit 130. In this case, the drop determination unit 140 determines that the electronic device 1 has dropped, for example, in a case where an acceleration acting on the electronic device 1 is greater than a predetermined threshold value. For example, the drop determination unit 140 determines whether or not the electronic device 1 has dropped, by comparing an acceleration acting on the electronic device 1 to a dropping acceleration stored in advance in the storage unit 10 and the like. For example, the drop determination unit 140 may have a function of calculation a distance at which the electronic device 1 has dropped and rolled, based on the dropping acceleration when determining the drop of the electronic device 1.

The notification method selection unit 150 selects a notification method for the user. The notification method selection unit 150 selects the notification method for the user based on a determination result of the situation around the electronic device 1, which has been obtained by the surrounding situation determination unit 110. For example, the notification method selection unit 150 selects whether a notification is performed by a sound, light, or by being transmitted to the terminal device possessed by the user, based on the surrounding situation.

For example, in a case where the electronic device is, for example, under an environment in which surrounding noise is relatively load, and it is determined that hearing audio from the audio output unit 52 has difficulty, or under an environment in which making a sound is not possible, the notification method selection unit 150 selects a notification by light or a notification by being transmitted to the terminal device. In this case, the notification method selection unit 150 may select both the notification by light and the notification by being transmitted to the terminal device.

The notification method selection unit 150 selects a notification by a sound or by being transmitted to the terminal device, under an environment such as an outdoor environment, in which it is determined that it is difficult to visually recognize light even though the light emitting unit 53 emits the light. In this case, the notification method selection unit 150 may select both the notification by a sound and the notification by being transmitted to the terminal device.

For example, the notification method selection unit 150 may select the notification method based on the movement situation of the user or a time zone. For example, the notification method selection unit 150 may select the notification method in a manner that priority of the notification by light is set to be low in the daytime and is set to be high in the night. For example, in a case where it is determined that the user moves by riding on a bicycle, the notification method selection unit 150 may select both the notification by a sound and the notification by being transmitted to the terminal device. For example, in a case where it is determined that the user moves by riding on a bicycle in the night, the notification method selection unit 150 may select both the notification by light and the notification by being transmitted to the terminal device.

For example, in a case where the notification method is set in advance in accordance with the place, the notification method selection unit 150 may select the selected notification method.

Figure 3:
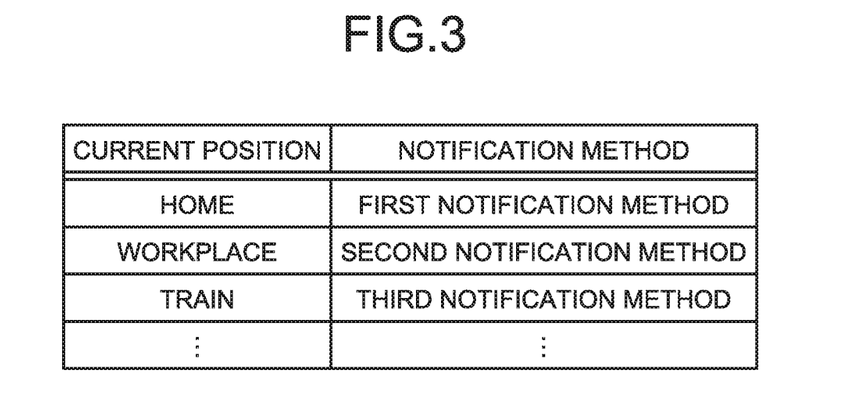
FIG. 3 is a schematic diagram illustrating an example of a method of setting a notification method according to the embodiment.

An example of a method of setting the notification method in accordance with the place will be described with reference to FIG. 3. FIG. 3 is a schematic diagram illustrating the example of the method of setting the notification method.

FIG. 3 illustrates a correspondence table in which the current position and the notification method are associated with each other. The position illustrated in FIG. 3 means a position at which the electronic device 1 has been dropped.

In the example illustrated in FIG. 3, in a case where the current position is home, a first notification method is associated. In a case where the current position is a workplace, a second notification method is associated. In a case where the current position is in a train, a third notification method is associated.

In a case of FIG. 3, in a case where it is determined that the current position is at home, the notification method selection unit 150 selects the first notification method as the notification method. In a case where it is determined that the current position is the workplace, the notification method selection unit 150 selects the second notification method as the notification method. In a case where it is determined that the current position is in the train, the notification method selection unit 150 selects the third notification method.

Here, various conditions regarding the notification methods are included in the first notification method, the second notification method, and the third notification method. For example, in a case of the first notification method selected in a case where it is determined to be home, there is a little risk of causing a trouble around in the notification. Thus, the notification method is not particularly limited. For example, in a case of the second notification method selected in a case where it is determined to be the workplace, or a case of the third notification method selected in a case where it is determined to be in the train, there is a risk of causing a trouble if a sound is made. Thus, the notification by a sound is not set as the notification method. Thus, the optimum notification method is selected in accordance with the place. In the embodiment, for example, the user can freely set the first notification method, the second notification method, and the third notification method. Thus, in the embodiment, it is possible to perform a notification by a method desired by the user, in accordance with the place in which the user is.

Descriptions will be made with reference to FIG. 2 again. If the notification method selection unit 150 selects the notification method, the notification method selection unit 150 outputs the selected notification method as selection information to the notification control unit 160.

The notification control unit 160 controls the notification unit 50 to notify the user, in accordance with the selection information received from the notification method selection unit 150. The notification control unit 160 includes a communication control unit 161, an audio control unit 162, and a light-emitting control unit 163.

The communication control unit 161 notifies the user by performing information communication with the terminal device of the user through the communication unit 51 in accordance with the selection information. In this case, the communication control unit 161 transmits, for example, a text signal indicating that the electronic device 1 has dropped, to the terminal device of the user. The communication control unit 161 transmits, for example, an audio signal indicating that the electronic device 1 has dropped, to the terminal device of the user. The communication control unit 161 transmits, for example, a vibration signal for vibrating the terminal device of the user to the terminal device of the user when the electronic device 1 has dropped.

The communication control unit 161 may transmit a determination result regarding an action of the user just before the electronic device 1 has dropped or transmit information regarding the place in which the user is, to the terminal device of the user. For example, in a case where a predetermined time has elapsed after the electronic device 1 has dropped, and thus it is determined that the electronic device 1 is lost, the communication control unit 161 may transmit information regarding the user just before the electronic device 1 has dropped, to the terminal device of the user. In this case, the communication control unit 161 may perform a notification of, for example, information that "the user has run the platform of the A station", "the user has been moving by riding in a train", or "the user has been in the B store". Specifically, for example, the notification method selection unit 150 determines whether or not the predetermined time has elapsed. In this case, the notification method selection unit 150 outputs a control signal to the communication control unit 161. The control signal indicates transmission of the information regarding the user to a preset notification destination such as the terminal device of the user. The communication control unit 161 may read the information regarding the user just before the electronic device 1 has dropped, from the storage unit 10, for example.

The audio control unit 162 notifies the user by outputting audio from the audio output unit 52 in accordance with the selection information. In this case, for example, the audio control unit 162 may output an alarm from the audio output unit 52 or output audio indicating that "the electronic device 1 has dropped".

The audio control unit 162 may change audio to be output, in accordance with the place in which the electronic device 1 has dropped. For example, the audio control unit 162 may output large audio in a case where surrounding noise is relatively loud and may output small audio in a case where the surrounding noise is relatively small. For example, the audio control unit 162 may output audio as large as the audio is not erased by the surrounding noise, from the audio output unit 52. In this case, for example, the audio control unit 162 may output audio in a low frequency band under an environment with large noise in a high frequency band and may output audio in the high frequency band under an environment with large noise in the low frequency band. The audio control unit 162 may change the audio to be output, for example, in accordance with a distance at which the electronic device 1 has dropped and rolled. In this case, for example, in a case where the distance at which the electronic device 1 has rolled from a drop point is equal to or longer than a predetermined distance, the audio control unit 162 may output audio set to be loud.

The audio control unit 162 may change audio to be output, in accordance with a usage status of the electronic device 1 by the user. For example, the audio control unit 162 may output audio as large as the audio attracts attentions of the user. For example, in a case where the user listens to music with the electronic device 1, the audio control unit 162 may output a sound of the music in a state of increasing the sound, when the electronic device 1 has been dropped. The audio control unit 162 may output, for example, music of the same category different from the music that was heard when the electronic device 1 has dropped. The audio control unit 162 may output, for example, a sound and the like of music preferred by the user or a favorite instrument when the electronic device 1 has been dropped. The music preferred by the user may be determined, for example, by acquiring a play history from a music player connected to the electronic device 1.

The audio control unit 162 may change the volume of audio to be output, in accordance with the usage status of the electronic device 1 by the user. For example, in a case where a detection value of the acceleration sensor 30 just before the electronic device 1 is dropped is smaller than a predetermined threshold value, the audio control unit 162 determines that the user is in a classroom or a train and sets a notification volume to be small. In a case where the detection value of the acceleration sensor 30 just before the electronic device 1 is dropped is equal to or greater than the predetermined threshold value, the audio control unit 162 determines that the user walks or moves by bicycle and sets the notification volume to be large.

The light-emitting control unit 163 notifies the user by causing the light emitting unit 53 to emit light in accordance with the selection information. In this case, for example, the light-emitting control unit 163 may cause the light emitting unit 53 to continuously emit light or to blink and emit light.

Figure 4:
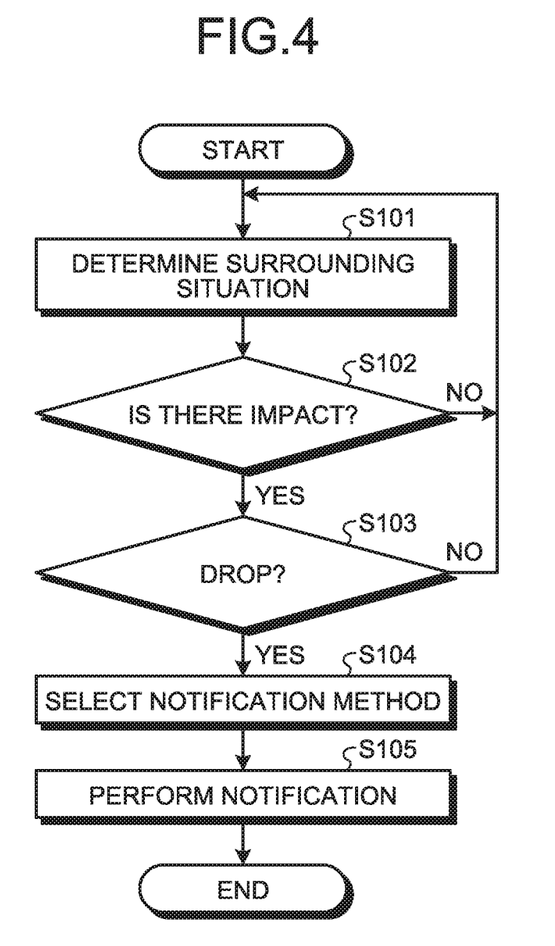
FIG. 4 is a flowchart illustrating an example of a flow of processing of the notification control device in the embodiment.

Processing of the notification control device will be described with reference to FIG. 4. FIG. 4 is a flowchart illustrating an example of a flow of the processing of the notification control device.

Firstly, the notification control device 100 determines a surrounding situation of the electronic device 1 (Step S101). Specifically, in the notification control device 100, the surrounding situation determination unit 110 determines the situation around the electronic device 1. The notification control device 100 causes the process to proceed to Step S102.

In Step S102, the notification control device 100 determines whether or not there is an impact acting on the electronic device 1. Specifically, in the notification control device 100, the impact information acquisition unit 130 determines whether or not there is the impact acting on the electronic device 1.

In a case where the impact acting on the electronic device 1 is not detected (No in Step S102), the notification control device 100 causes the process to return to Step S101 and performs the above-described processing. In a case where the impact acting on the electronic device 1 is detected (Yes in Step S102), the notification control device 100 causes the process to proceed to Step S103.

Then, in Step S103, the notification control device 100 determines whether or not the impact detected in Step S102 occurs by the drop of the electronic device 1.

Specifically, in the notification control device 100, the drop determination unit 140 determines whether or not the electronic device 1 is dropped.

In a case where it is determined that the electronic device 1 is not dropped (No in Step S103), the notification control device 100 causes the process to return to Step S101 and performs the above-described processing. In a case where it is determined that the electronic device 1 has dropped (Yes in Step S103), the notification control device 100 causes the process to proceed to Step S104.

Then, the notification control device 100 selects the notification method of notifying the user that the electronic device 1 has dropped (Step S104). Specifically, in the notification control device 100, the notification method selection unit 150 selects the notification method. The notification control device 100 causes the process to proceed to S105.

The notification control device 100 notifies the user that the electronic device 1 has dropped, by the selected notification method (Step S105). Specifically, the notification control device 100 notifies the user by the notification control unit 160.

Figure 5:
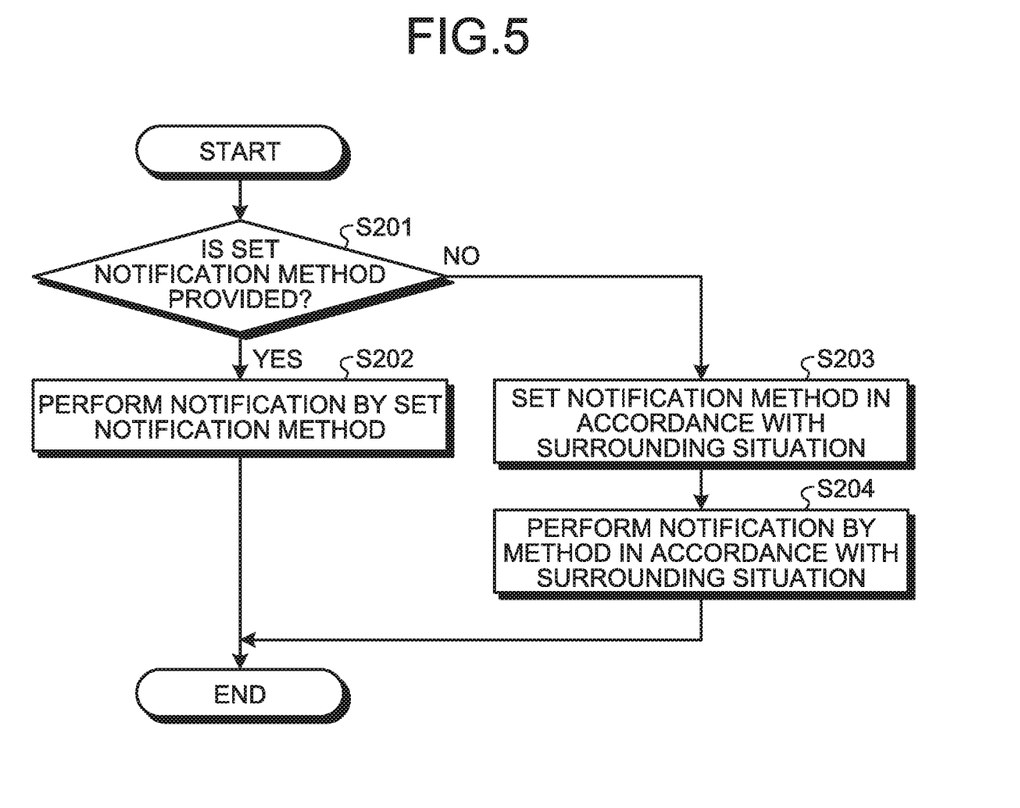
FIG. 5 is a flowchart illustrating an example of a flow of processing of selecting the notification method.

Processing of selecting the notification method will be described in more detail with reference to FIG. 5. FIG. 5 is a flowchart illustrating an example of a flow of the processing of selecting the notification method.

Firstly, in Step S201, the notification control device 100 determines whether or not the notification method set by the user is provided. Specifically, in the notification control device 100, the notification method selection unit 150 determines whether or not the notification method set by the user is provided.

In a case where the notification method set by the user is provided (Yes in Step S201), the notification control device 100 causes the process to proceed to Step S202 and notifies the user by the set notification method (Step S202). Specifically, the notification control device 100 notifies the user by the notification method set by the notification control unit 160.

In a case where the notification method set by the user is not provided (No in Step S201), the notification control device 100 causes the process to proceed to Step S203, and the notification method selection unit 150 selects the notification method based on a determination result obtained by the surrounding situation determination unit 110 (Step S203). The notification control device 100 causes the process to proceed to Step S204 and notifies the user by the notification method in accordance with the surrounding situation (Step S204).

As described above, in the embodiment, it is possible to notify the preset notification destination that an electronic device has dropped, by a method in accordance with the surrounding situation when the electronic device has dropped. Thus, the user can appropriately recognize that the electronic device has dropped. Accordingly, it is possible to perform a notification effective for preventing loss in a case where the electronic device drops.

Second Embodiment

In a second embodiment, after an electronic device 1 has dropped, for example, after a predetermined time has elapsed, information regarding an action of a user when the electronic device 1 has dropped is transmitted to a notification destination set in advance. For example, a terminal device of the user may be set as the notification destination. A configuration of the electronic device 1 in the second embodiment is similar to the configuration in the first embodiment, but processing after the drop is detected is different.

Figure 6:
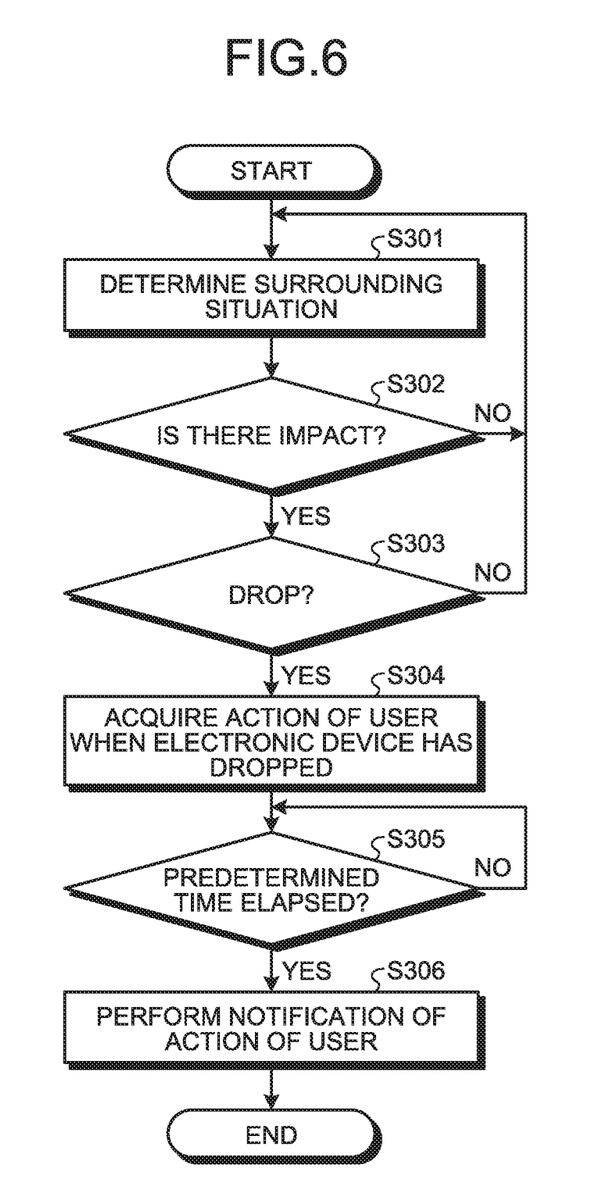
FIG. 6 is a flowchart illustrating an example of a flow of processing of performing a notification of information regarding an action of a user.

Processing of a notification control device in the embodiment will be described with reference to FIG. 6. FIG. 6 is a flowchart illustrating an example of a flow of processing of the notification control device.

The processes of Step S301 to Step S303 are similar to the processes of Step S101 to S103 illustrated in FIG. 4, and descriptions thereof will not be repeated.

In a case where it is determined that the electronic device 1 has dropped (Yes in Step S303), the notification control device 100 acquires an action of the user just before a time point at which the electronic device 1 has dropped (Step S304). Specifically, in the notification control device 100, the surrounding situation determination unit 110 acquires information regarding the action of the user from a storage unit 10. The notification control device 100 causes the process to proceed to S305.

In Step S305, the notification control device 100 determines whether or not a predetermined time has elapsed after the electronic device 1 has dropped. Specifically, in the notification control device 100, the notification method selection unit 150 determines whether or not a predetermined time has elapsed.

In a case where the predetermined time does not have elapsed (No in Step S305), the notification control device 100 repeats the process of Step S305. In a case where the predetermined time has elapsed (Yes in Step S305), the notification control device 100 causes the process to proceed to Step S306.

Then, the notification control device 100 performs a notification of the acquired information regarding the action of the user (Step S306). Specifically, the communication control unit 161 performs a notification in a manner that the communication unit 51 transmits the information regarding the user to the notification destination set in advance.

In the embodiment, the electronic device 1 may have a function of canceling the notification. For example, the electronic device 1 may have a configuration in which, if a button provided in the electronic device 1 is pressed after the drop determination, the notification can be canceled. The notification method selection unit 150 determines whether or not a predetermined time has elapsed without pressing a cancel button after it is determined that the electronic device 1 has dropped. Since a notification cancel button is provided, it is possible to prevent an unnecessary notification in a case where the electronic device is not lost, for example, in a case where the user picks up the electronic device just after the electronic device has dropped.

In the embodiment, it is possible to notify a user of information including an action of a user just before a time point at which an electronic device has dropped, for example, when the electronic device has dropped, and thus is lost. Thus, the user can appropriately recognize a situation when the electronic device has dropped. Accordingly, it is possible to perform a notification effective for preventing loss in a case where the electronic device drops.

According to the present disclosure, it is possible to perform a notification effective for preventing loss in a case where an electronic device has dropped.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A notification control device comprising:
a surrounding situation determination unit that determines a situation around a user;
an impact detection unit that detects an impact on an electronic device possessed by the user;
a drop determination unit that determines whether the impact occurs by drop of the electronic device;
a notification method selection unit that selects a notification method in accordance with the situation around the user in response to determining that the impact occurs by the drop; and
a notification control unit that controls a notification unit configured to notify the user of information such that the notification is performed by the notification method selected by the notification method selection unit;

wherein the surrounding situation determination unit determines whether a value of a motion of the user just before the electronic device is dropped is greater than a predetermined value.

2. The notification control device according to claim 1, wherein the notification method selection unit selects the notification method based on position information of the user.

3. The notification control device according to claim 1, wherein the notification method selection unit selects the notification method based on a usage status of the electronic device of when the electronic device is dropped.

4. The notification control device according to claim 1, wherein
the notification unit comprises a communication unit that communicates with an external terminal device, an audio output unit that outputs a sound, and a light emitting unit that emits light, and
the notification control unit controls at least one of the communication unit, the audio output unit, and the light emitting unit.

5. The notification control device according to claim 4, wherein the notification control unit controls a combination of the communication unit, the audio output unit, and the light emitting unit in accordance with the situation around the user.

6. The notification control device according to claim 1, wherein
in a case in which the notification method selection unit selects a notification by audio, and in response to a determination by the surrounding situation determination that the value of the motion of the user is smaller than the predetermined value, the notification control unit controls the notification unit to perform the notification by a sound smaller than a sound in a case in which the motion of the user is equal to or greater than the predetermined value.

7. The notification control device according to claim 1, wherein, the notification unit comprises a communication unit that notifies a preset notification destination of the situation around the user, in a case in which the drop determination unit determines that the impact occurs by the drop, the situation around the user being determined by the surrounding situation determination unit just before a time point at which the electronic device is dropped.

8. The notification control device according to claim 7, further comprising:
a storage unit,
wherein the surrounding situation determination unit causes the storage unit to store the a record of the situation around the user.

9. A notification control method comprising:
determining a situation around a user;
detecting an impact on an electronic device possessed by the user;
determining whether the impact occurs by drop of the electronic device;
selecting a notification method in accordance with the situation around the user in response to determining that the impact occurs by the drop; and
controlling a notification unit configured to generate a notification of information such that the notification is performed by the notification method,
wherein the determining of the situation comprises determining whether a value of a motion of the user just before the electronic device is dropped is greater than a predetermined value.

10. A non-transitory computer-readable storage medium storing a program that, in response to execution, causes a computer to execute:
a surrounding situation determination step of determining a situation around a user;
an impact detection step of detecting an impact on an electronic device possessed by the user;
a drop determination step of determining whether the impact occurs by drop of the electronic device;
a notification method selection step of selecting a notification method in accordance with the situation around the user in response to determining, by the drop determination step, that the impact occurs by the drop; and
a notification control step of controlling a notification unit configured to notify of information such that the notification is performed by the notification method selected in the notification method selection step,
wherein the surrounding situation determination step determines whether a value of motion of the user just before the electronic device is dropped is greater than a predetermined value.

* * * * *